US005222457A

United States Patent [19]

Friedrich

[11] Patent Number: 5,222,457

[45] Date of Patent: Jun. 29, 1993

[54] INDICATOR FOR ROTARY POSITIONER

[75] Inventor: Werner Friedrich, Regensburg, Fed. Rep. of Germany

[73] Assignee: Maschinenfabrik Reinhausen GmbH, Regensburg, Fed. Rep. of Germany

[21] Appl. No.: 872,888

[22] Filed: Apr. 23, 1992

[30] Foreign Application Priority Data

Apr. 24, 1991 [DE] Fed. Rep. of Germany ....... 4113332

[51] Int. Cl.[5] .............................. G01D 13/04

[52] U.S. Cl. .............................. 116/284; 116/DIG. 21; 200/308; 74/570

[58] Field of Search ............... 116/277, 284, 298, 300, 116/301, 302, DIG. 21; 200/308, 316; 74/570, 595, DIG. 7

[56] References Cited

U.S. PATENT DOCUMENTS

| | | | |
|---|---|---|---|
| 2,596,550 | 5/1952 | Handley | 116/298 |
| 3,151,598 | 10/1964 | Bourns et al. | 116/DIG. 21 |
| 3,517,638 | 6/1970 | Kern | 116/298 |
| 3,811,403 | 5/1974 | Braukmann | 116/284 |
| 3,894,507 | 7/1975 | Koechlin | 116/298 |
| 3,981,621 | 9/1976 | Considine | 116/DIG. 21 |
| 4,411,288 | 10/1983 | Gain, Jr. | 116/DIG. 21 |

FOREIGN PATENT DOCUMENTS

| | | | |
|---|---|---|---|
| 8104888 | 8/1982 | Fed. Rep. of Germany . | |
| 3541888 | 1/1988 | Fed. Rep. of Germany . | |
| 6835 | 4/1895 | United Kingdom | 116/277 |
| 589305 | 6/1947 | United Kingdom | 116/277 |

*Primary Examiner*—Thomas B. Will
*Attorney, Agent, or Firm*—Herbert Dubno; Andrew Wilford

[57] ABSTRACT

A position indicator for a shaft rotatable about an axis has a housing fixed adjacent the shaft, a plurality of indicia on the housing angularly equispaced about and radially equispaced from the axis, an eccentric fixed on the shaft and having a periphery that is eccentric to the axis, and an inner indicator plate carried on the periphery of the eccentric, having a periphery with a predetermined rectified length, and formed offset from the axis with an axially throughgoing inner aperture axially alignable with the indicia. A guide fixed on the housing forms a track on which the periphery of the inner indicator plate rides. This track has a predetermined rectified length longer than the rectified length of the periphery of the inner plate so that the indicator plate rolls on the track as the shaft and eccentric rotate. An outer indicator plate fixed on the shaft adjacent the first indicator plate is formed with an axially throughgoing outer aperture axially alignable with the indicia.

7 Claims, 2 Drawing Sheets

INDICATOR FOR ROTARY POSITIONER

FIELD OF THE INVENTION

The present invention relates to an indicator for a rotary positioner. More particularly this invention concerns a positioner used on a multiple-position step switch for a transformer.

BACKGROUND OF THE INVENTION

In German patent 3,541,888 of W. Friedrich and German utility model 8,104,864 position indicators are shown which indicate the angular position of a shaft that can turn through more than one revolution between end positions. This is the case in a step switch for a transformer that is used to change the voltage output and that is normally switched when the power is off.

As a rule such a positioner is operated manually and in a multi-phase system the shaft is connected by gearing to the shafts of switches for the various phases. The operator fits a crank or wrench to the end of the adjustment shaft and rotates it until the desired position number is visible in a window in the positioner housing. The normal angular displacement from position to position is equal to $(360-360/n)^\circ$ where n is the number of contacts and therefore also the number of positions. This is necessary because the switch element is not only rotated but also moved radially by an eccentric as it rotates out of engagement with the contacts.

In the system of German patent 3,541,888 a crank-carrying adjustment shaft parallel to and spaced from the switch shaft is connected to this switch shaft by stepdown gearing. The adjustment shaft carries a disk bearing angularly spaced indicia and the switch shaft carries a disk having an aperture that can be aligned with the indicia of the switch shaft. Such an arrangement is fairly complex and bulky.

The system of German Utility Model 8,104,864 has a disk bearing the indicia and carried on a shaft coupled through gearing to the switch shaft, with the indicia laid out in a multiturn spiral. A window formed in a radially displaceable element can be aligned with the various turns of the spiral and is radially displaced by a cam coupled to the indicia disk. Once again this system is fairly bulky.

OBJECTS OF THE INVENTION

It is therefore an object of the present invention to provide an improved position indicator for a step switch or the like.

Another object is the provision of such an improved position indicator for a step switch or the like which overcomes the above-given disadvantages, that is which is relatively compact and simple, and that in fact can be mounted right on the switch shaft.

SUMMARY OF THE INVENTION

A position indicator for a shaft rotatable about an axis according to the invention has a housing fixed adjacent the shaft, a number n of indicia on the housing angularly equispaced about and radially equispaced from the axis, an eccentric fixed on the shaft and having a periphery that is eccentric to the axis, and an inner indicator plate carried on the periphery of the eccentric, having a periphery with a predetermined rectified length l, and formed offset from the axis with an axially throughgoing inner aperture axially alignable with the indicia. A guide fixed on the housing forms a track on which the periphery of the inner indicator plate rides. This track has a predetermined rectified length L longer than the rectified length l of the periphery of the inner plate so that the indicator plate rolls on the track as the shaft and eccentric rotate. An outer indicator plate fixed on the shaft adjacent the first indicator plate is formed with an axially throughgoing outer aperture axially alignable with the indicia.

According to this invention $l/L=1-1/n$. Thus each time the shaft is rotated through $(360-360/n)^\circ$ the two apertures align with each other and with one of the indicia.

With the system of this invention the entire position indicator is comprised of only a few parts, all but one of which are fixed on the shaft or on the housing. Only the inner plate moves relative to both the shaft and the disk. Thus this indicator can be mounted in a reduced space right on the step switch or its insulating shaft.

According to the invention the track is centered on the axis and lies radially outside the indicia. Furthermore this track is provided with a plurality of angularly equispaced formations and the periphery of the inner plate is formed with complementary and identically spaced formations. The track has one more such formation than the inner plate.

The eccentric itself is a disk fixed on the shaft and the eccentric periphery is circular. The inner plate is a ring having a circular inner periphery radially engaging the eccentric periphery and complementary thereto. Normally both the eccentric and inner plate lie axially between the outer plate and the housing.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
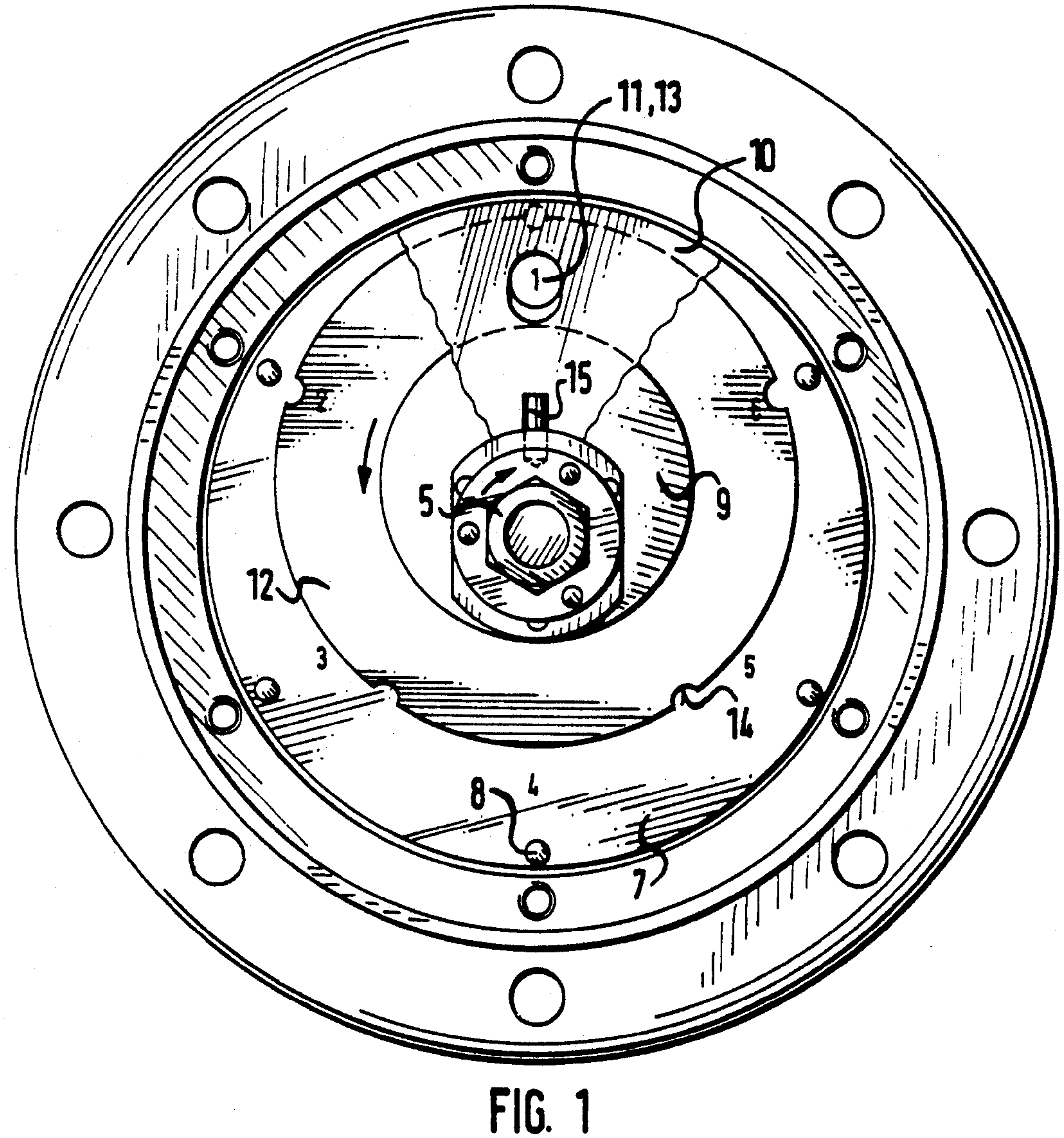
FIG. 1 is a partly sectional axial end view of the positioner according to the invention.
Figure 2:
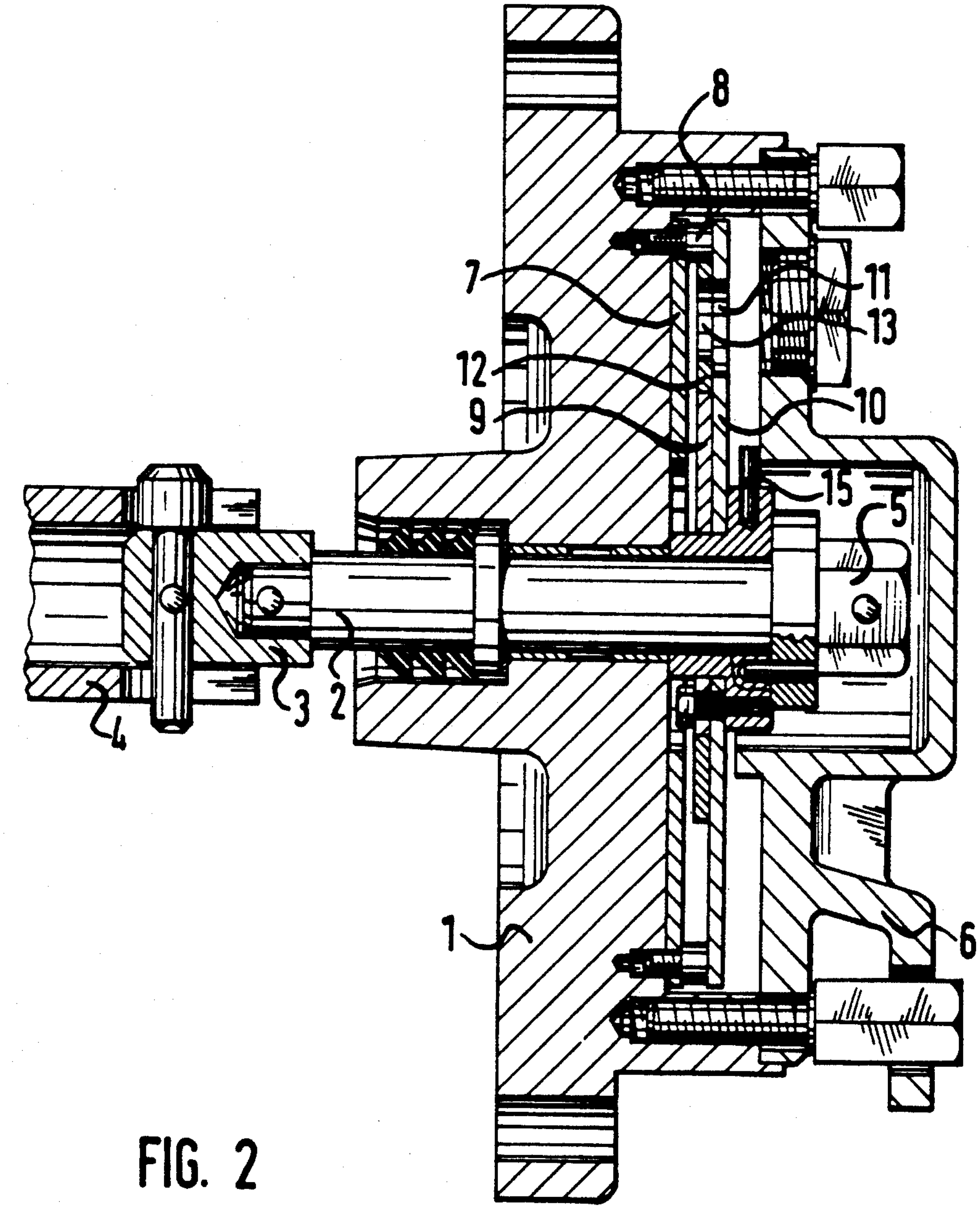
FIG. 2 is an axial section through the positioner.

As seen in the drawing a shaft 2 is rotatable about an axis A in a stationary housing 1 and is connected via an insulating coupling 3 to a shaft 4 of a step switch. The shaft 2 has an outer end provided with a six-sided nut 5 that can be exposed by removal of a cover plate 6 held on by bolts 16 and provided with a port 17 radially offset from the axis A. A pin 15 fixed on the shaft 2 fits in a notch in the cover plate 6 to ensure that it can only be mounted in one angular position on the housing, this position being as described below with the port 17 indicating the set position.

A disk 7 fixed on the housing 1 by six angularly equispaced studs 8 is provided with indicia 18, here six numbers 1 though 6 which are angularly equispaced about and radially equispaced from the axis. An eccentric disk 9 fixed on the shaft has a circular outer periphery that is centered on a point offset from the axis A and an inner indicating ring 12 has a circular inner periphery riding on the outer periphery of the eccentric 9 and an outer periphery formed with five angularly equispaced and radially outwardly open notches 14.

The six studs 8 form a guide or track and are spaced apart by a distance which is exactly equal to the distance between adjacent notches 14 of the ring 12. In addition the diameters of the peripheries of the ring 12 and of the eccentric 9 are such that the outer periphery of the ring 12 rolls on the track-forming studs 8 with one of the studs 8 always seated in one of the notches 14. Since there are only five notches 14 and there are six studs 8, it is obvious that as the ring 12 rolls around on the studs 8 it will reverse rotate through 60° (that is 360° divided by the number of studs 8) with each 300° rotation of the shaft 2.

The ring 12 is formed with a throughgoing aperture 13 that is axially aligned with one of the indicia 18 when the notch immediately adjacent the aperture 13 is engaged over the stud next to this one of the indicia 18. Thus in the illustrated embodiment when the eccentric 9 moves through 300° the aperture 13 will orbit opposite to the rotation direction to align with the adjacent indicia.

An outer indicator disk 10 is mounted directly on the shaft 2 and is formed with an outer aperture 11 slightly larger than the inner aperture 13. This outer aperture 11 will orbit on rotation of the shaft 2 at the same radial level as the indicia The device operates as follows:

As the shaft rotates, for example, clockwise as indicated by the arrow in FIG. 1 from the starting position with both apertures 11 and 13 aligned with the first indicia, it will cause the outer disk 10 to move to cover up this indicia and will simultaneously cause the ring 12 to rotate counterclockwise (see arrow in FIG. 1) on the eccentric 9. Thus while the aperture 11 of the outer disk 10 orbits clockwise, the aperture 13 of the ring 12 will orbit epicyclically counterclockwise.

After 300° of revolution of the shaft 2 the outer aperture 11 will come clockwise into alignment with the second indicia 18 and simultaneously the inner aperture 13 will come into alignment with the same indicia, indicating that the step switch on the shaft 4 is set in the appropriate position. Then the cover 6 can be reinstalled with the newly exposed number visible through the port 17.

I claim:

1. A position indicator for a shaft rotatable about an axis, the indicator comprising:

- a housing fixed adjacent the shaft;
- a plurality of indicia on the housing angularly equispaced about and radially equispaced from the axis;
- an eccentric fixed on the shaft and having a periphery that is eccentric to the axis;
- an inner indicator plate carried on the periphery of the eccentric, having a periphery with a predetermined rectified length, and formed offset from the axis with an axially throughgoing inner aperture axially alignable with the indicia;
- a guide fixed on the housing and forming a track on which the periphery of the inner indicator plate rides, the track having a predetermined rectified length longer than the rectified length of the periphery of the inner plate, whereby the indicator plate rolls on the track as the shaft and eccentric rotate; and
- an outer indicator plate fixed on the shaft adjacent the inner indicator plate and formed with an axially throughgoing outer aperture axially alignable with the indicia.

2. The indicator defined in claim 1 wherein the track is centered on the axis and lies radially outside the indicia.

3. The indicator defined in claim 2 wherein the track is provided with a plurality of angularly equispaced formations and the periphery of the inner plate is formed with complementary and identically spaced formations, the track having more of the respective formations than the inner plate.

4. The indicator defined in claim 3 wherein the track has one more such formation than the inner plate.

5. The indicator defined in claim 1 wherein the eccentric is a disk fixed on the shaft and the eccentric periphery is circular, the inner plate being a ring having a circular inner periphery radially engaging the eccentric periphery and complementary thereto.

6. The indicator defined in claim 1 wherein the eccentric and inner plate lie axially between the outer plate and the housing.

7. A position indicator for a shaft rotatable about an axis, the indicator comprising:

- a housing fixed adjacent the shaft;
- a predetermined number n of indicia on the housing angularly equispaced about and radially equispaced from the axis;
- an eccentric disk fixed on the shaft and having a circular outer periphery that is eccentric to the axis;
- an inner indicator ring carried on the periphery of the eccentric, having a circular outer periphery with a circumference c, and formed offset from the axis with an axially throughgoing inner aperture axially alignable with the indicia;
- a circular track on which the periphery of the inner indicator plate rides and having a circumference C greater than the circumference of the inner-ring periphery, the ratio of the circumferences being such that:

$$c/C=1-1/n,$$

- an outer indicator disk fixed on the shaft adjacent the indicator ring and formed with an axially throughgoing outer aperture axially allowable with the indicia; and whereby the indicator ring rolls on the track as the shaft and eccentric rotate and the apertures align every $(1-1/n)$ revolution and expose one of the indicia.

* * * * *